No. 720,045. PATENTED FEB. 10, 1903.
J. H. MATHESON.
MANUFACTURE OF BUTT WELD PIPE.
APPLICATION FILED JAN. 15, 1902.
NO MODEL.
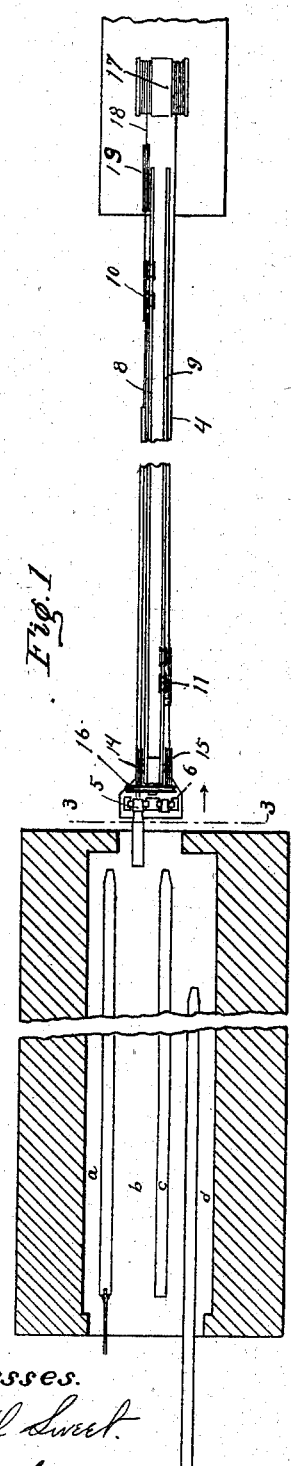
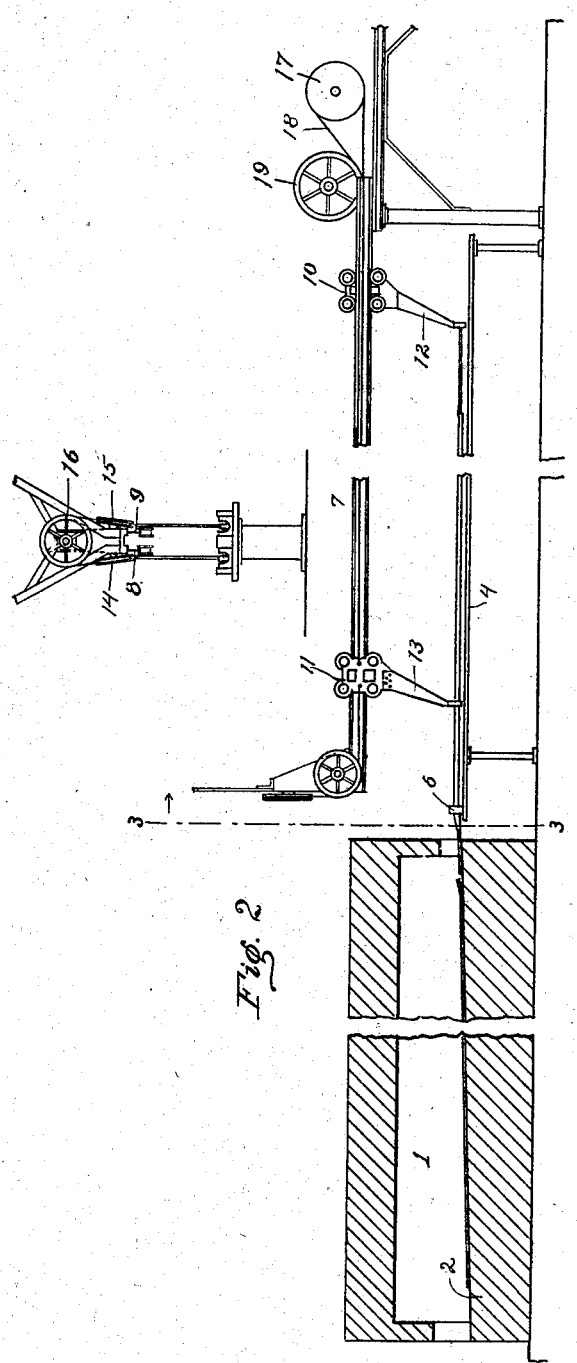
Witnesses.
Inventor:
James H. Matheson
By Kay & Totten
Attorneys.

UNITED STATES PATENT OFFICE.

JAMES H. MATHESON, OF MIDDLETOWN, PENNSYLVANIA, ASSIGNOR TO NATIONAL TUBE COMPANY, OF PITTSBURG, PENNSYLVANIA, A CORPORATION OF PENNSYLVANIA.

MANUFACTURE OF BUTT-WELD PIPE.

SPECIFICATION forming part of Letters Patent No. 720,045, dated February 10, 1903.

Application filed January 15, 1902. Serial No. 89,841. (No model.)

*To all whom it may concern:*

Be it known that I, JAMES H. MATHESON, a resident of Middletown, in the county of Dauphin and State of Pennsylvania, have invented a new and useful Improvement in the Manufacture of Butt-Weld Pipe; and I do hereby declare the following to be a full, clear, and exact description thereof.

My invention relates to the manufacture of butt-weld tubing from flat plates or other blanks by welding in bells, its object being to provide for the handling of the tube-blanks in the furnace and the withdrawal of the same therefrom, so that though the tube-blanks are moved laterally in the furnace they can be so moved before they are at such heat as to be too flexible for easy handling and also so that they will reach their final-heating positions when cool enough to chill the portions of the furnace-bed on which they rest and enable such chilled portions of the bed to act upon and aid in holding their bodies at a lower temperature than their edges, so that when the edges are at a welding heat the bodies will be stiff enough to take proper form in the bell and force the edges together with sufficient pressure to cause perfect welding.

To these ends my invention consists in providing upon the furnace-bed heating territories for the plates or other blanks—two final-heating territories and two feeding territories, one at the side of each final-heating territory—and in heating and transforming the blanks into butt-weld tubing by feeding cold blanks longitudinally into the furnace into the feeding territories, alternately moving the blanks in such feeding territories laterally into the final-heating territories adjoining the same, raising the edges to a welding heat when in such position, and withdrawing the blanks longitudinally from the furnace alternately from such two final-heating territories and into and through the welding-bells, it being made practicable in so operating to bring the blanks into the final-heating territories before they are too highly heated for easy handling and while they are sufficiently cooled to chill the portions of the beds which they cover, so that such chilled portions may in turn keep the bodies of the blanks from too high heating, and therefore sufficiently stiff to be properly formed in the welding-bells.

To enable others skilled in the art to make and use my invention, I will describe the same more fully, referring to the accompanying drawings, in which—

Figure 1 is a plan view of a welding-furnace, illustrating the invention. Fig. 2 is a longitudinal section of the furnace and side view of the drawing apparatus; and Fig. 3 is a cross-section on the line 3 3, Fig. 2.

In the practice of my invention I employ any suitable welding-furnace in which the tube-blanks, which are shown and will be hereinafter referred to as "flat plates," may be raised to a proper welding heat substantially uniform throughout their length, the furnace being preferably heated by gas and being of the regenerative type, such as is ordinarily used for this purpose. This furnace is shown at 1, having the hearth 2, which is inclined, as shown in Fig. 2, to carry off the liquor from the furnace. The hearth is formed of gravel, sand, or other suitable material, and, as shown in the drawings, it has four heating sections or territories for the plates, such heating territories being substantially parallel with each other and being marked $a$, $b$, $c$, and $d$. The outer sections $a$ and $d$ are the feeding territories into which the plates are charged, and the inner sections $b$ and $c$ are the final-heating territories, where the plates lie until at welding heat.

Any suitable drawing apparatus, stationary or movable, for withdrawing plates from the furnace may be used, the only requirement of the same being that it shall provide for drawing the plates from the two final-heating territories, and for that purpose I have illustrated a suitable overhead drawing apparatus, which only requires a general description. The bench 4, as shown, is stationary and carries two bell-holders 5 and 6 at the front end in line with the final-heating territories $b$ and $c$, as shown in Fig. 1. Above the bench is supported the drawing apparatus 7, having two suitable tracks 8 and 9, on which are mounted the trolleys 10 and 11, having the depending drawing-arms 12 and 13. At the front end of the drawing apparatus are the pulleys 14 and 15 and above the same the pulley 16, and at the rear thereof is the driving-drum 17, on which the wire rope or like driving means is wound, the rope 18 passing directly from the drum 17 to the trolley 10, and thence around the pulley 14, over the pulley 16, and back around the pulley 15 and extending to the trolley 11, and thence under the pulley 19 at the rear end of the drawing apparatus and passing on to the drum 17 in the opposite direction, so that when the drum is rotated in one direction the rope winds off one portion of the same and on to the opposite portion of the same. The two trolleys, with their depending drawing-arms, are mounted in proper positions, so that one will be at the rear end of the drawing apparatus while the other is at the forward end ready to receive the welding-tongs, and vice versa. The drum is of course driven by any suitable power. It will be noticed in Fig. 3 that the depending arms of the trolleys are located, respectively, opposite the two final-heating territories $b$ and $c$ in the furnace and are therefore adapted to draw plates, one from one such final-heating territory and the other from the other final-heating territory.

In the practice of the invention with the apparatus shown the plates for forming the tubing, having their front ends suitably trimmed and bent for entering the furnace and the welding-bells, are fed from the rear end of the furnace into the furnace-chamber in practically the following way: One plate is fed first longitudinally through the rear end of the furnace into the feeding territory $a$ at one side of the furnace-bed, and another plate is so fed longitudinally into the feeding territory $d$ at the other side of the furnace-bed. Before the plate in the territory $a$ is too highly heated for easy lateral movement it is moved laterally into the final-heating territory $b$, and at the proper time the plate in the feeding territory $d$ is moved laterally into the final-heating territory $c$, the two plates being thus brought into their final-heating positions side by side within the central drawing portion of the hearth. At proper times other plates are fed longitudinally into the feeding-sections $a$ and $d$, and when a plate in the final-heating section $b$ is at proper welding heat for drawing the welder grasps the same with his tongs and throws the bell over the tongs and into position in front of the bell-holder 5 and engages the tongs with the depending drawing-arm 12, when the drawing mechanism is set in motion and this plate is drawn from the front of the furnace and through the welding-bell and welded into the tubing. As soon as it passes from the furnace the plate in the feeding-section $a$, by a picker or other suitable tool, is moved into the final-heating section $b$, and this can be done quickly by a short lateral movement as soon as the plate being welded passes from the furnace, the time of longitudinal charging being thus saved. When the plate in the final-heating section $c$ reaches proper welding condition, the welder grasps it with the tongs, throws the bell over it, and engages the tongs with the drawing-arm 6, (which has been moved forward in the drawing of the first tube,) and as soon as this plate is drawn from the furnace the plate in the feeding-section $d$ is moved laterally into the final-heating section $c$. In the practice of the invention the operators watch the condition of the plates and feed the plates into the outer feeding-sections $a$ and $d$ at such times that they will not become too highly heated to be moved into the final-heating sections $b$ and $c$, the objects being to have the plates in the proper position to be moved quickly into the final-heating sections as soon as the fully-heated plates are withdrawn therefrom, and by providing the two different final-heating sections $b$ and $c$ and after plates are withdrawn therefrom quickly replacing them to insure more rapid working and make it practicable to obtain large output and yet provide for the lateral movement of the plates before they are highly heated and while they are stiff enough to be easily handled by the workmen; further, to make it practicable to place the plates into their final positions for heating while they are sufficiently cool to chill the bottom of the furnace under the same, and in so doing to provide colder portions or streaks on the furnace-bed to chill or absorb heat from the bodies of the plates as the edges approach the welding temperature, and so hold the main portion of the bodies of the plates stiff enough to properly form up within the welding-bell. In so operating I am also enabled to bring the edges of the plates to substantially uniform welding heat throughout their length when employing a furnace so highly heated that the times of charging and withdrawing are material factors in the heating of the plates, as the plates are charged in the rear and withdrawn from the front of the furnace and the heat absorbed by the plate in entering is substantially balanced by the heat absorbed in withdrawing. For certain sizes of tubing such hearth positions will be sufficient; but for other sizes of tubing the furnace-hearth may have to be enlarged and two such groups of feeding and heating territories be employed, the welding mechanism being arranged to draw the plates from the different final-heating territories in the furnace.

I have shown two final-heating territories and two feeding territories outside the same; but it is obvious that any desired number of final-heating territories may be used to accommodate the necessary number of plates to keep the drawing apparatus in continuous operation. In all cases a number of feeding territories will be provided which is equal to the number of final-heating territories, one at the side of each of the latter.

The drawing apparatus shown and described is not claimed in this application, but is claimed in my application filed January 23, 1902, Serial No. 90,972.

What I claim as my invention, and desire to secure by Letters Patent, is—

1. The herein-described method of heating and transforming flat plates into butt-weld tubing, consisting in heating plates in a plurality of final-heating territories substantially parallel with each other upon the furnace-bed, successively withdrawing the plates from said territories through the front end of the furnace and through welding-bells, feeding cold plates longitudinally through the rear end of the furnace into feeding territories, one at the side of each final-heating territory, and upon the withdrawal of a heated plate from either of the final-heating territories, moving the plate resting in the feeding territory adjoining the same laterally into said final-heating territory, substantially as described.

2. The herein-described method of heating and transforming flat plates into butt-weld tubing, consisting in heating plates in two final-heating territories parallel with each other upon the furnace-bed, alternately withdrawing the plates from said final-heating territories through the front end of the furnace and through welding-bells, feeding cold plates longitudinally through the rear end of the furnace alternately into feeding territories, one at the side of each final-heating territory, and, upon the withdrawal of a heated plate from either of the final-heating territories for welding, moving the plate resting in the feeding territory adjoining the same laterally into said final-heating territory, substantially as described.

3. The herein-described method of making butt-weld tubing, consisting in heating tube-blanks in a plurality of final-heating territories substantially parallel with each other upon the furnace-bed, successively withdrawing the blanks from said territories and through welding-bells, feeding cold blanks longitudinally into the feeding territories in the furnace, one at the side of each final-heating territory, and upon the withdrawal of a heated blank from either of the final-heating territories, moving the blank resting in the feeding territory adjoining the same laterally into said final-heating territory.

4. The herein-described method of manufacturing butt-weld tubing, consisting in heating tube-blanks in two final-heating territories upon the furnace-bed, alternately withdrawing the blanks from said final-heating territories and through welding-bells, feeding cold blanks longitudinally into feeding territories in the furnace, one at the side of each final-heating territory, and upon the withdrawal of the heated blank from either of the final-heating territories, moving the blank resting in the feeding territory adjoining the same laterally into said final-heating territory.

In testimony whereof I, the said JAMES H. MATHESON, have hereunto set my hand.

JAMES H. MATHESON.

Witnesses:
 JOS. H. NISLEY,
 HARRY H. JOHNSON.